(12) United States Patent
Ishida

(10) Patent No.: US 9,405,060 B2
(45) Date of Patent: Aug. 2, 2016

(54) OPTICAL FIBER CABLE

(71) Applicant: FUJIKURA LTD., Tokyo (JP)

(72) Inventor: Itaru Ishida, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/833,320

(22) Filed: Aug. 24, 2015

(65) Prior Publication Data

US 2016/0062035 A1 Mar. 3, 2016

(30) Foreign Application Priority Data

Aug. 29, 2014 (JP) ................................. 2014-176285

(51) Int. Cl.
*G02B 6/44* (2006.01)
*G02B 6/02* (2006.01)

(52) U.S. Cl.
CPC ............ *G02B 6/02042* (2013.01); *G02B 6/443* (2013.01); *G02B 6/4432* (2013.01); *G02B 6/4478* (2013.01)

(58) Field of Classification Search
None
See application file for complete search history.

(56) References Cited

U.S. PATENT DOCUMENTS

| | | | | |
|---|---|---|---|---|
| 8,406,595 B2* | 3/2013 | Hayashi | ............. | G02B 6/02042 385/123 |
| 8,478,098 B2* | 7/2013 | Hayashi | ............. | G02B 6/02042 385/126 |
| 8,861,914 B2* | 10/2014 | Hayashi | ............. | G02B 6/02042 385/126 |
| 8,923,678 B2* | 12/2014 | Fini | .................... | G02B 6/02042 385/126 |
| 9,031,368 B2* | 5/2015 | Hayashi | ............. | G02B 6/02042 385/100 |
| 9,164,228 B2* | 10/2015 | Hayashi | ............. | G02B 6/02042 |
| 2011/0129190 A1* | 6/2011 | Fini | .................... | G02B 6/02042 385/126 |
| 2011/0235983 A1* | 9/2011 | Hayashi | ............. | G02B 6/02042 385/100 |
| 2014/0153882 A1* | 6/2014 | Hayashi | ............. | G02B 6/02042 385/100 |
| 2016/0062035 A1* | 3/2016 | Ishida | ................ | G02B 6/02042 385/109 |

FOREIGN PATENT DOCUMENTS

| | | |
|---|---|---|
| EP | 2 365 366 A2 | 9/2011 |
| JP | H04-42832 A | 2/1992 |
| JP | H09-297251 A | 11/1997 |
| JP | 2011-197661 A | 10/2011 |
| JP | 2013-513131 A | 4/2013 |

OTHER PUBLICATIONS

Hirakawa et al., "Ultra-high density cable with Multicore fiber", IEICE, 2014, (3 pages).
Ishida et al., "Multicore-fiber Cable with Core Density of 6 cores/mm2", OFC, 2014, (4 pages).
Office Action dated Jun. 7, 2016, issued in counterpart Japanese Patent Application No. 2014-176285, with English translation. (2 pages).

* cited by examiner

*Primary Examiner* — Rhonda Peace
(74) *Attorney, Agent, or Firm* — Westerman, Hattori, Daniels & Adrian, LLP

(57) ABSTRACT

An optical fiber cable includes a tubular sheath and a plurality of optical fibers disposed in the space of the sheath as the optical fibers are bent. In the plurality of optical fibers, at least one optical fiber is a multicore fiber. The multicore fiber satisfies an expression $R_{Pk} < R_{Lo}$, or $R_{Hi} < R_{Pk}$, where a bending radius at which the crosstalk of the multicore fiber becomes the worst is defined as $R_{Pk}$, a bending radius of the multicore fiber at a lowest temperature in operating temperature limits is defined as $R_{Lo}$, and a bending radius of the multicore fiber at a highest temperature in the operating temperature limits is defined as $R_{Hi}$.

4 Claims, 4 Drawing Sheets

OPTICAL FIBER CABLE

BACKGROUND OF THE INVENTION

The present invention relates to an optical fiber cable using a multicore fiber, and is preferred to the case where crosstalk is suppressed.

Optical fibers for use in generally widely available optical fiber communication systems have a structure in which the outer circumference of a single core is surrounded by a cladding, and optical signals are propagated through the inside of this core to transmit information. Information volumes to be transmitted are dramatically increased in association with the widespread use of optical fiber communication systems. In association with an increase in information volumes to be transmitted as described above, in the optical fiber communication system, long distance optical communications of a large capacity are conducted using a large number of optical fibers. Moreover, such an optical fiber cable is used in which these optical fibers are provided in a sheath to form a cable.

On the other hand, in order to decrease the number of optical fibers in the optical fiber communication system, it is known that a multicore fiber is used in which the outer circumferences of a plurality of cores are surrounded by a single cladding, and a plurality of signals is transmitted on light propagated through the cores.

Patent Literature 1 below describes an optical fiber cable in which a plurality of multicore fibers like this optical fiber is bundled to form a cable. Generally in the multicore fiber, such a tendency is observed that crosstalk is prone to occur in which optical signals propagated through cores interfere with each other. It is known that this crosstalk depends on the bending radius of a multicore fiber and is reached at the maximum at a predetermined bending radius. Therefore, in Patent Literature 1, in order to decrease crosstalk, a bending structure is additionally provided to a multicore fiber in such a manner that a bending radius $R_{th}$ given by a predetermined expression takes the smallest value.

[Patent Literature 1] JP-A-2011-197661

SUMMARY OF THE INVENTION

However, even in the case where a bending structure is additionally provided to a multicore fiber as in the optical fiber cable described in Patent Literature 1, it was found by the present inventors that crosstalk sometimes becomes the worst depending on an environment on which the optical fiber cable is installed.

The sheath of an optical fiber cable is formed of a resin, and the optical fiber is formed in which an element optical fiber typically made of silica is covered with a protective layer made of a resin. Therefore, the thermal expansion coefficient of the sheath is different from the thermal expansion coefficient of the optical fiber. In other words, the length of the optical fiber is not changed so much caused by a change in the ambient temperature of an environment in which the optical fiber cable is installed, whereas the length of the sheath is greatly changed as compared with the optical fiber. Therefore, the bending radius of the optical fiber disposed in the sheath is changed depending on the ambient temperature. This temperature change causes a change in the bending radius of the optical fiber, leading to a bending radius at which crosstalk becomes the worst, and crosstalk sometimes becomes the worst as described above. However, Patent Literature 1 does not consider temperature changes.

Therefore, it is an object of the present invention to provide an optical fiber cable that can suppress crosstalk even in the case where the ambient temperature is changed.

An optical fiber cable of the present invention includes: a tubular sheath; and a plurality of optical fibers disposed in a space of the sheath as the plurality of optical fibers is bent, wherein in the plurality of optical fibers, at least one optical fiber is a multicore fiber including a plurality of cores, and the multicore fiber satisfies an expression $$R_{Pk} < R_{Lo},$$

or $$R_{Hi} < R_{Pk}$$

where a bending radius at which crosstalk of the multicore fiber becomes the worst is defined as $R_{Pk}$, a bending radius of the multicore fiber at a lowest temperature in operating temperature limits is defined as $R_{Lo}$, and a bending radius of the multicore fiber at a highest temperature in the operating temperature limits is defined as $R_{Hi}$.

The plurality of the optical fibers is disposed in the space of the sheath as the plurality of optical fibers is bent, so that the optical fiber cable is appropriately installed with a predetermined flexibility. As described above, in a typical optical fiber cable, the sheath is mainly formed of a resin, and the optical fiber is mainly formed of silica. Since the thermal expansion coefficient of silica is very small, a change in the length caused by a temperature change is greater in the sheath than in the optical fiber. Thus, the bending radius of the multicore fiber is the smallest at the lowest temperature in the operating temperature limits, and the greatest at the highest temperature in the operating temperature limits. Therefore, the bending radius $R_{Lo}$ of the multicore fiber satisfies the expression $R_{Pk} < R_{Lo}$ at the lowest temperature in the operating temperature limits, so that the bending radius of the multicore fiber is not reached at $R_{Pk}$ even in the case where the temperature is changed in the operating temperature limits. Similarly, the bending radius $R_{Hi}$ of the multicore fiber satisfies the expression $R_{Hi} < R_{Pk}$ at the highest temperature in the operating temperature limits, so that the bending radius of the multicore fiber is not reached at $R_{Pk}$ even in the case where the temperature is changed in the operating temperature limits. The bending radius of the multicore fiber satisfies the expression $R_{Pk} < R_{Lo}$, or $R_{Hi} < R_{Pk}$ as described above, it is possible to avoid the state in which the crosstalk becomes the worst. Thus, in accordance with the optical fiber cable according to the embodiment of the present invention, it is possible to suppress crosstalk even in the case where the ambient temperature is changed.

Moreover, it may be fine that the plurality of optical fibers is twisted and bundled.

As described above, according to an aspect of the present invention, there is provided an optical fiber cable that can suppress crosstalk even in the case where the ambient temperature is changed.

DETAILED DESCRIPTION OF THE INVENTION

In the following, a preferred embodiment of an optical fiber cable according to an aspect of the present invention will be described in detail with reference to the drawings.

Figure 1:
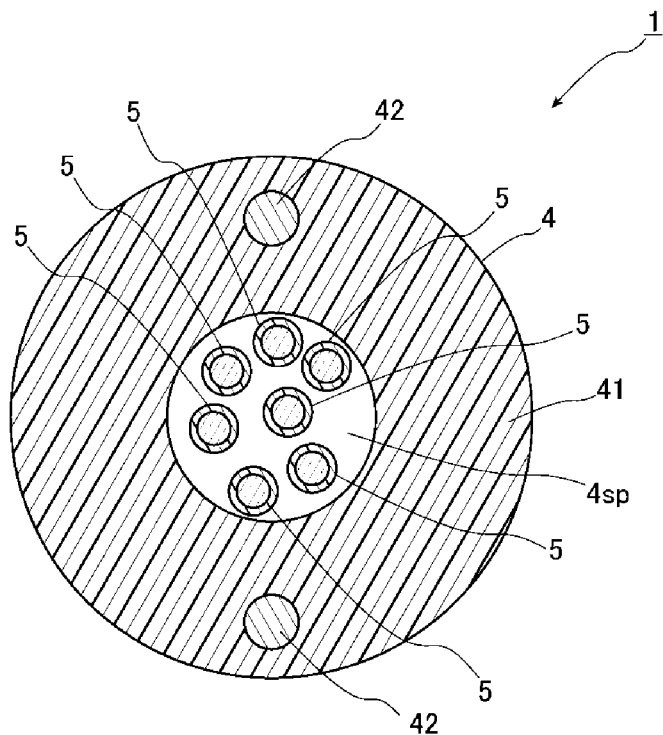
FIG. 1 is a cross sectional view of an optical fiber cable according to an embodiment of the present invention.

FIG. 1 is a cross sectional view of an optical fiber cable according to a first embodiment of the present invention. As illustrated in FIG. 1, an optical fiber cable 1 according to the embodiment includes a sheath 4 and a plurality of multicore fibers 5. It is noted that in the embodiment, an example is described in which seven multicore fibers 5 are provided.

The sheath 4 has a tubular cross section perpendicular to the longitudinal direction, and the center part of the cross section is a circular hollow. This sheath 4 includes a sheath main body 41 and a reinforcement member 42. The sheath main body 41 is formed of a resin, and forms the exterior of the sheath 4. A resin forming the sheath main body 41 includes a thermoplastic resin, for example. This thermoplastic resin includes resins including polyvinyl chloride (PVC), polyethylene (PE), polyamide (PA), fluoroethylene, and polypropylene (PP), for example. The reinforcement member 42 is formed of a metal wire, and is a member that gives strength to the optical fiber cable 1. The reinforcement member 42 is formed of copper, iron, nickel, stainless steel, or fiber reinforced plastic (FRP), for example.

Figure 2:
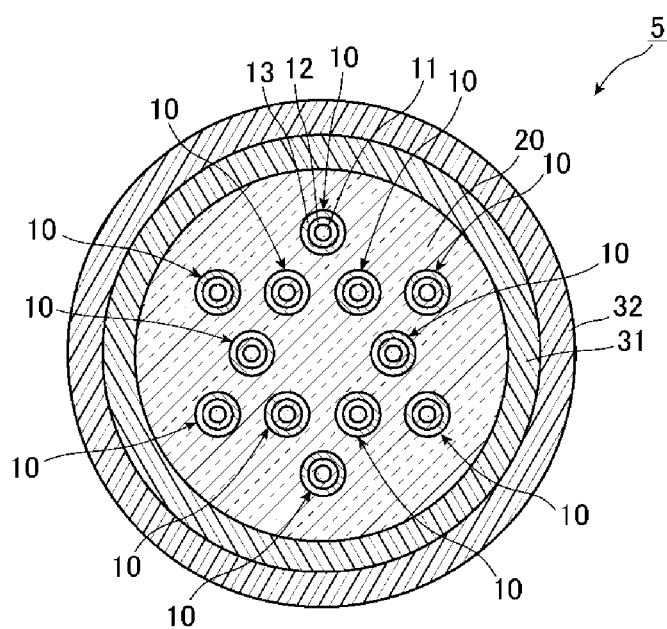
FIG. 2 is a cross sectional view of a multicore fiber in FIG. 1.

FIG. 2 is a cross sectional view of the multicore fiber in FIG. 1. The multicore fiber 5 according to the embodiment includes a plurality of core elements 10, a cladding 20 that entirely encloses the core elements 10 and surrounds the outer circumferential surfaces of the core elements 10 to fill the space between the core elements 10, a protective layer 31 that covers the outer circumferential surface of the cladding 20, and a colored layer 32 that covers the outer circumferential surface of the protective layer 31. In the embodiment, the description will be made as the multicore fiber is taken as an example in which 12 core elements 10 are disposed.

The element multicore fiber formed of a plurality of the core elements 10 and the cladding 20 is made of silica that a dopant is doped to at least a part of the element multicore fiber, and the protective layer 31 and the colored layer 32 are made of resins. Silica has a thermal expansion coefficient smaller than the thermal expansion coefficient of a metal used for the reinforcement member 42, and has the thermal expansion coefficient very smaller than the thermal expansion coefficient of a resin used for the sheath main body 41. Therefore, the multicore fibers 5 have a very small change in the length caused by a temperature change as compared with the sheath 4.

The core elements 10 individually include a core 11, an inner cladding layer 12 that surrounds the outer circumferential surface of the core 11, and a trench layer 13 that surrounds the outer circumferential surface of the inner cladding layer 12. Moreover, the core elements 10 are disposed in such a manner that a distance (an inter-center pitch) between cores adjacent to each other at the shortest distance is equal to each other. More specifically, six core elements 10 are disposed in such a manner that the centers of the cores 11 are located on the apexes of a regular hexagon relative to the center of the cladding 20. The other six core elements 10 are disposed in such a manner that the centers of the cores 11 are located on the apexes of a regular hexagon greater than that regular hexagon and a regular triangle is formed of the center of a single core element 10 on the outside and the centers of two core elements 10 on the inner side. In the embodiment, the diameters of the cores 11 are made equal to one another, the outer diameters of the inner cladding layers 12 are made equal to one another, and the outer diameters of the trench layers 13 are made equal to one another. Thus, the thicknesses of the inner cladding layers 12 are made equal to one another, and the thicknesses of the trench layers 13 are made equal to one another.

Moreover, the refractive indexes of the cores 11 are made equal to one another, the refractive indexes of the inner cladding layers 12 are made equal to one another, and the refractive indexes of the trench layers 13 are made equal to one another. The refractive index of the core 11 is higher than the refractive index of the cladding 20. Furthermore, the refractive index of the inner cladding layer 12 is lower than the refractive index of the core 11, and the refractive index of the trench layer 13 is lower than the refractive index of the inner cladding layer 12 and the refractive index of the cladding 20. Thus, in the case where the core elements 10 are seen from the viewpoint of the refractive index, the core elements 10 have a trench structure because the refractive index of the trench layer 13 is lower than the refractive indexes of the inner cladding layer 12 and the cladding 20. It is noted that the relationship between the refractive index of the inner cladding layer 12 and the refractive index of the cladding 20 is appropriately set for adjusting the wavelength dispersion characteristics.

The refractive index of the trench layer 13 is made smaller than the refractive index of the inner cladding layer 12 and the refractive index of the cladding 20 as described above, so that light is drawn to the core 11 not to the cladding 20 side. Therefore, the optical confinement effect on the core 11 is improved, and it is possible to decrease the leakage of light propagated through the core 11 out of the core elements 10. The trench layer 13 of a low refractive index and the cladding are barriers, and it is possible to decrease the crosstalk between the cores 11 adjacent to each other.

It is noted that, differently from the description above, it may be fine that the diameters or refractive indexes of the cores 11 adjacent to each other are different from each other so as to vary the effective refractive indexes of the cores 11 adjacent to each other, it may be fine that the outer diameters or refractive indexes of the inner cladding layers 12 adjacent to each other are different from each other, and it may be fine that the outer diameters or refractive indexes of the trench layers 13 adjacent to each other are different from each other. The effective refractive indexes of the cores adjacent to each other are different as described above, so that the propagation constants of the cores adjacent to each other are varied, and it is possible to further decrease crosstalk.

Figure 3:
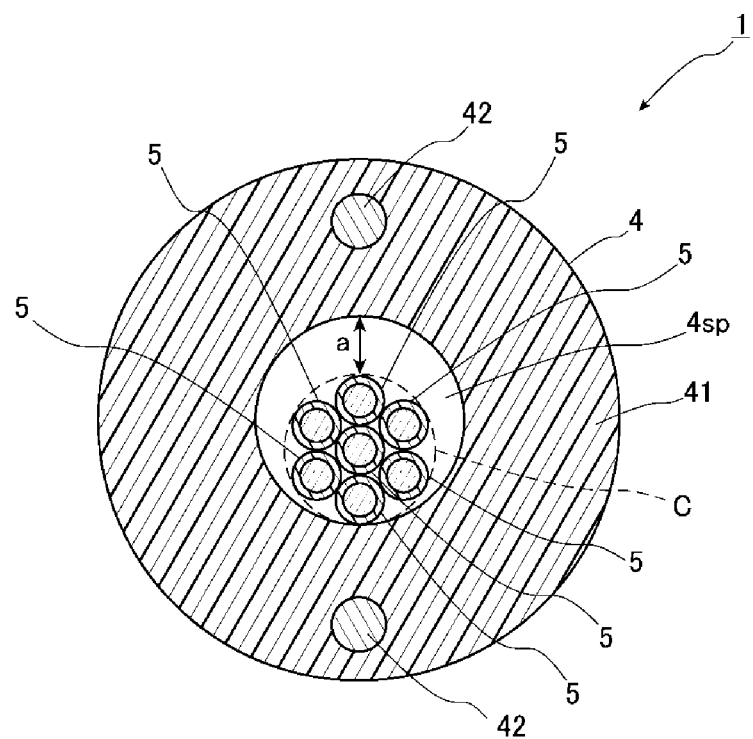
FIG. 3 is a diagram of the state in which a plurality of the multicore fibers is bundled in the optical fiber cable in FIG. 1.
Figure 4:
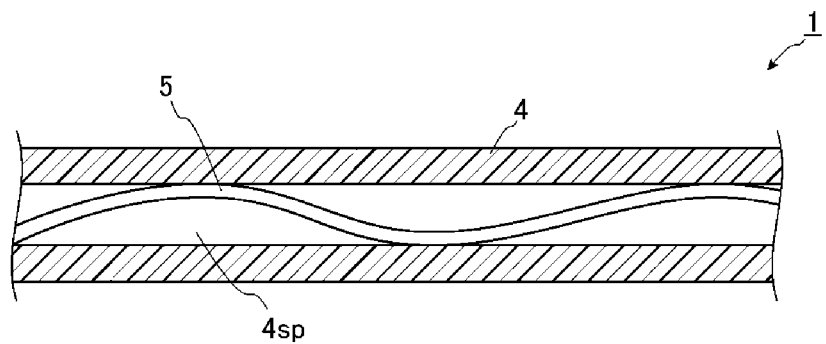
FIG. 4 is a diagram of the state of the multicore fiber in the case where the optical fiber cable in FIG. 1 is seen from the direction perpendicular to the longitudinal direction.

Next, the disposition of a plurality of the multicore fibers 5 will be described. FIG. 3 is a diagram of the state in which a plurality of the multicore fibers 5 is bundled in the optical fiber cable in FIG. 1. Moreover, FIG. 4 is a diagram of the state of the multicore fiber 5 in the case where the optical fiber cable 1 in FIG. 1 is seen from the direction perpendicular to the longitudinal direction. However, in FIG. 4, only a single multicore fiber 5 is depicted for easy understanding, and the other multicore fibers 5 are omitted. Furthermore, in the following description, the bending radius means an average bending radius.

As illustrated in FIG. 3, suppose that a plurality of the multicore fibers 5 illustrated in FIG. 1 is disposed in the inside of a space 4sp of the sheath 4 in the state in which the multicore fibers 5 are closely bundled, a gap at a maximum distance a is produced between a circumcircle C of a plurality of the multicore fibers 5 and the inner wall of the sheath 4. In other words, a plurality of the multicore fibers 5 is disposed in the inside of the space 4sp of the sheath 4 with a spatial margin, and a gap is produced among the multicore fibers 5 in the state illustrated in FIG. 1. As illustrated in FIG. 4, the multicore fibers 5 are disposed in the state in which the multicore fibers 5 are bent in the inside of the space 4sp of the sheath 4. Here, suppose that the length of the sheath 4 is defined as $L_1$ at a room temperature $T_0$, and the lengths of the multicore fibers 5 bent and disposed in the inside of the space 4sp of the sheath 4 are defined as $L_2$. In this case, Expression (1) is satisfied.

$$L_1 < L_2 \quad (1)$$

It is noted that the lengths $L_2$ of the multicore fibers 5 to be disposed are nearly equal to one another. Moreover, in this case, an extra length factor L of the multicore fiber 5 at the room temperature $T_0$ is expressed by Expression (2).

$$L = \frac{L_2 - L_1}{L_1} \quad (2)$$

In this case, suppose that the linear expansion coefficient of the sheath 4 is defined as k, a bending radius R of the multicore fiber 5 at a certain temperature T in the operating temperature limits of the optical fiber cable is expressed by Expression (3).

$$R = \frac{a}{4(L - k(T_0 - T))} \quad (3)$$

This bending radius R converges almost on the bending radius R derived from Expression (3) from the view point of the average of the total length of the cable even in the case where the multicore fibers 5 are separately disposed as illustrated in FIG. 1. It is noted that since the linear expansion coefficient of the multicore fiber 5 is smaller than the linear expansion coefficient of the sheath 4, the influence of the linear expansion coefficient of the multicore fiber 5 is small as the influence on the bending radius R can be ignored. Thus, in Expression (3), the linear expansion coefficient of the multicore fiber 5 is omitted.

Next, the relationship between the bending radius of the multicore fiber and the crosstalk will be described.

Figure 5:
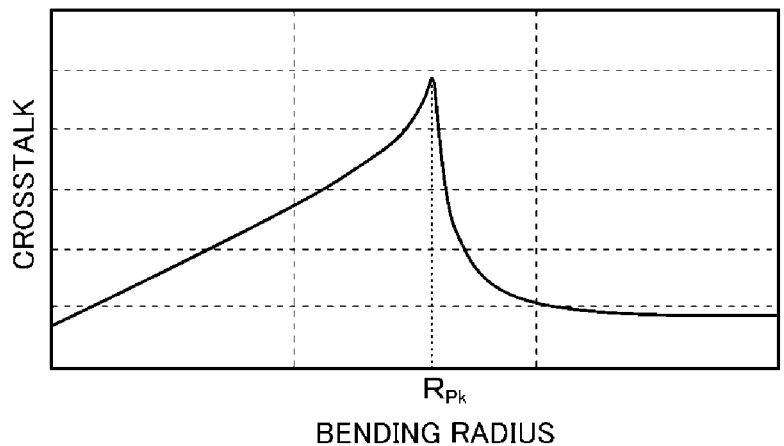
FIG. 5 is a diagram of the relationship between the bending radius of the multicore fiber and the crosstalk.

FIG. 5 is a diagram of the relationship between the bending radius of the multicore fiber and the crosstalk. Suppose that in the multicore fiber, the effective refractive index of one of the cores adjacent to each other is defined as $n_{eff1}$ and the other is defined as $n_{eff2}$, an effective refractive index difference $\Delta n_{eff}$ is expressed by Expression (4).

$$\Delta n_{eff} = |n_{eff1} - n_{eff2}| \quad (4)$$

In the case where a multicore fiber is bent, a change in the bending radius of the multicore fiber causes a change in the effective refractive indexes of the cores, and the crosstalk reaches the peak at a predetermined bending radius $R_{Pk}$ as illustrated in FIG. 5. Therefore, suppose that the inter-core distance between the cores is defined as D, the bending radius $R_{Pk}$ of the multicore fiber at which the crosstalk reaches the peak is expressed by Expression (5).

$$R_{Pk} = \frac{n_{eff1}}{\Delta n_{eff}} D \quad (5)$$

Even in the case where the bending radius R described above is changed within the operating temperature limits, it is possible to avoid the state in which the crosstalk of the multicore fiber 5 becomes the worst when the bending radius of the multicore fiber 5 in the optical fiber cable is not matched with the bending radius $R_{Pk}$.

More specifically, it is fine that a bending radius $R_{Lo}$ of the multicore fiber 5 is greater than the bending radius $R_{Pk}$ in the case where the lowest temperature is defined as $T_{Lo}$ in the operating temperature limits as illustrated in FIG. 5. In other words, it is fine that the expression $R_{Pk} < R_{Lo}$ is held. When the expression is expressed using Expressions (3) and (5), the multicore fiber is disposed in the sheath 4 in such a manner that Expression (6) is satisfied, so that it is possible to avoid the state in which the crosstalk of the multicore fiber 5 becomes the worst.

$$R_{Pk} < \frac{a}{4(L - k(T_0 - T_{Lo}))} \quad (6)$$

Alternatively, it is fine that a bending radius $R_{Hi}$ of the multicore fiber 5 is made smaller than the bending radius $R_{Pk}$ in the case where the highest temperature in the operating temperature limits is defined as $T_{Hi}$ as illustrated in FIG. 5. In other words, it is fine that the expression $R_{Hi} < R_{Pk}$ is held. When the expression is expressed using Expressions (3) and (5), the multicore fiber is disposed in the sheath 4 in such a manner that Expression (7) is satisfied, so that it is possible to avoid the state in which the crosstalk of the multicore fiber 5 becomes the worst.

$$\frac{a}{4(L - k(T_0 - T_{Hi}))} < R_{Pk} \quad (7)$$

The following is the reason why it is fine that Expression (6) or Expression (7) is satisfied in the multicore fiber 5. In other words, when the state in which the temperature of the optical fiber cable 1 is low is compared with the state in which the temperature is high, the length $L_1$ of the sheath 4 whose thermal expansion coefficient is large is greatly varied between a low temperature state and a high temperature state. However, since the thermal expansion coefficient of the multicore fiber 5 is very small as compared with the thermal expansion coefficient of the sheath 4, a change in the length $L_2$ of the multicore fiber 5 caused by a temperature change is very small as compared with a change in the length $L_1$ of the sheath 4. Thus, the extra length factor L of the multicore fiber 5 in the optical fiber cable 1 is smaller in the low temperature state than in the high temperature state. Therefore, the bending radius R of the multicore fiber 5 is greater in the low temperature state than in the high temperature state. Thus, the multicore fiber 5 is disposed in the sheath 4 as described above, so that it is possible to avoid that the bending radius of the multicore fiber 5 in the optical fiber cable 1 is matched with the bending radius $R_{Pk}$.

As described above, the optical fiber cable 1 according to the embodiment includes the tubular sheath 4 and a plurality of the multicore fibers 5 disposed in the inside of the space 4sp of the sheath 4 in the state in which the multicore fibers 5 are bent, and in the multicore fiber 5, the expression $R_{Pk}<R_{Lo}$, or $R_{Hi}<R_{Pk}$ is satisfied. According to this optical fiber cable 1, a plurality of the multicore fibers 5 is bent and disposed in the inside of the space 4sp of the sheath 4, and the optical fiber cable 1 is appropriately installed with a predetermined flexibility. The sheath 4 is mainly formed of a resin, and the multicore fiber 5 is mainly formed of silica. Therefore, a change in the length caused by a temperature change is greater in the sheath 4 than in the multicore fiber 5. Thus, the bending radius R of the multicore fiber 5 is the smallest at the lowest temperature $T_{Lo}$ in the operating temperature limits, and is the greatest at the highest temperature $T_{Hi}$ in the operating temperature limits. Therefore, the bending radius $R_{Lo}$ of the multicore fiber 5 at the temperature $T_{Lo}$ satisfies the expression $R_{Pk}<R_{Lo}$, so that the bending radius R of the multicore fiber 5 is not reached at $R_{Pk}$ even in the case where the temperature is changed in the operating temperature limits. Similarly, the bending radius $R_{Hi}$ of the multicore fiber 5 at the temperature $T_{Hi}$ satisfies the expression $R_{Hi}<R_{Pk}$, so that the bending radius R of the multicore fiber is not reached at $R_{Pk}$ even in the case where the temperature is changed in the operating temperature limits. As described above, the bending radius R of the multicore fiber R satisfies the expression $R_{Pk}<R_{Lo}$, or $R_{Hi}<R_{Pk}$, so that it is possible to avoid the state in which the crosstalk becomes the worst. Thus, in accordance with the optical fiber cable 1 according to the embodiment, it is possible to suppress crosstalk even in the case where the ambient temperature is changed.

As described above, an aspect of the present invention is described as the embodiment is taken as an example. However, the present invention is not limited to the embodiment.

For example, in the embodiment, all the optical fibers disposed in the sheath 4 are the multicore fibers 5. It may be fine that at least one optical fiber is the multicore fiber 5 and that an optical fiber other than the multicore fiber 5 is included.

Moreover, in the embodiment, the multicore fibers 5 disposed in the sheath 4 are not bundled as illustrated in FIG. 1. However, it may be fine that the multicore fibers 5 disposed in the sheath 4 are bundled as illustrated in FIG. 3. In order to bundle the multicore fibers 5 as described above, it may be fine that a plurality of the multicore fibers 5 is twisted and bundled. In the case where a plurality of the multicore fibers 5 is bundled and twisted in this manner, a pitch of a twist is large, and the influence of a twist on the bending radius R of the multicore fiber 5 is very small and can be ignored.

EXAMPLES

In the following, the content of the present invention will be described more in detail as an example and a comparative example are taken, and the present invention is not limited to the example.

Ten multicore fibers 12 including core elements illustrated in FIG. 2 were prepared. In these multicore fibers, the outer diameter of the cladding was 230 μm, and the outer diameter of the colored layer was 370 μm. Subsequently, these multicore fibers were disposed in the inside of the space of the sheath illustrated in FIG. 1. The length $L_1$ of the cable at a room temperature was 2,000 m. The operating temperature limits of this optical fiber cable are in a temperature range from −30° C. to 70° C. The bending radius $R_{Hi}$ of the multicore fiber 5 in the sheath at the highest temperature in the operating temperature limits was smaller than the bending radius $R_{Pk}$ at which the crosstalk becomes the worst. In other words, in the example, the inner diameter of the sheath is designed in such a manner that the bending radius of the multicore fiber takes the bending radius as described above.

Figure 6:
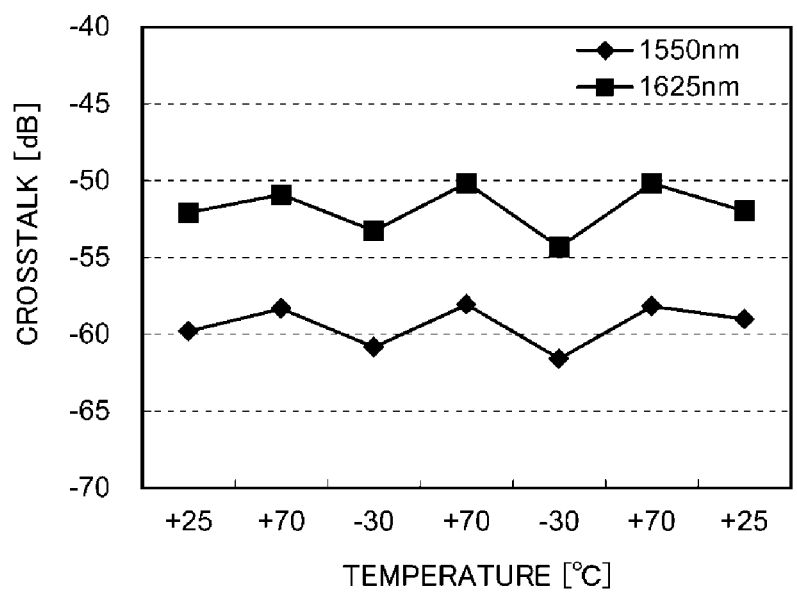
FIG. 6 is a diagram of the crosstalk of an optical fiber cable at temperatures of −30° C., 25° C., and 70° C. according to an example.
Figure 7:
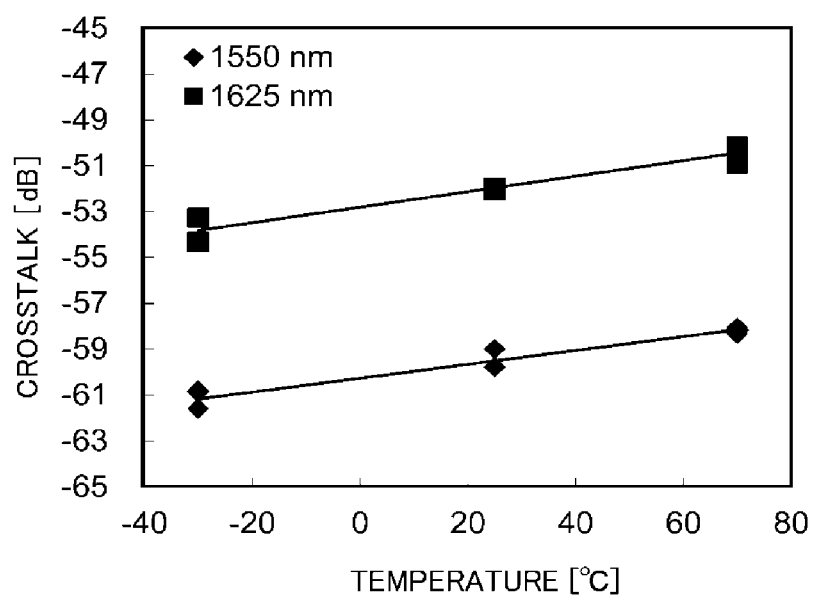
FIG. 7 is a diagram of the temperature dependence of the crosstalk of an optical fiber cable according to an example.

Subsequently, a temperature cycle test at temperatures from −30° C. to 70° C. was conducted on the prepared optical fiber cable in which light at a wavelength of 1,550 nm was entered to the cable and crosstalk was measured at temperatures of −30° C., 25° C., and 70° C. Similarly, light at a wavelength of 1,625 nm was entered to the cable, and crosstalk was measured at temperatures of −30° C., 25° C., and 70° C. The result is illustrated in FIG. 6. Moreover, the temperature dependence of the crosstalk of the optical fiber cable derived from this result is illustrated in FIG. 7. As illustrated in FIGS. 6 and 7, even the value of the greatest crosstalk is about −50 dB, and it is revealed that an excellent crosstalk is maintained.

As described above, in accordance with the optical fiber cable according to the embodiment of the present invention, it is revealed that crosstalk can be suppressed even in the case where the ambient temperature is changed.

As described above, according to the embodiment of the present invention, there is provided an optical fiber cable that can suppress crosstalk even in the case where the ambient temperature is changed, and the optical fiber cable can be used in the field of optical communications, for example.

The invention claimed is:

1. An optical fiber cable comprising:
a tubular sheath; and
a plurality of optical fibers disposed in a space of the sheath as the plurality of optical fibers is bent, wherein
in the plurality of optical fibers, at least one optical fiber is a multicore fiber including a plurality of cores, and
the multicore fiber satisfies an expression $$R_{Pk}<R_{Lo},$$

or $$R_{Hi}<R_{Pk}$$

where a bending radius at which crosstalk of the multicore fiber becomes the worst is defined as $R_{Pk}$, a bending radius of the multicore fiber at a lowest temperature in operating temperature limits is defined as $R_{Lo}$, and a bending radius of the multicore fiber at a highest temperature in the operating temperature limits is defined as $R_{Hi}$.

2. The optical fiber cable according to claim 1, wherein when the plurality of optical fibers is bundled, the multicore fiber satisfies an expression $$R_{Pk} < \frac{a}{4(L-k(T_0-T_{Lo}))}$$

where an average size of a clearance between the bundle and an inner wall of the sheath is defined as a, an extra length factor of the plurality of optical fibers in the sheath is defined as L, a linear expansion coefficient of the sheath is defined as k, a room temperature is defined as $T_0$, and a lowest temperature in the operating temperature limits is defined as $T_{Lo}$.

3. The optical fiber cable according to claim 1, wherein when the plurality of optical fibers is bundled, the multicore fiber satisfies an expression $$\frac{a}{4(L-k(T_0-T_{Hi}))} < R_{Pk}$$

where an average size of a clearance between the bundle and an inner wall of the sheath is defined as a, an extra length factor of the plurality of optical fibers in the sheath is defined as L, a linear expansion coefficient of the sheath is defined as k, a room temperature is defined as $T_0$, and a highest temperature in the operating temperature limits is defined as $T_{Hi}$.

4. The optical fiber cable according to claim 1, wherein the plurality of optical fibers is twisted and bundled.

* * * * *